(12) United States Patent
Geringer et al.

(10) Patent No.: US 12,380,690 B2
(45) Date of Patent: Aug. 5, 2025

(54) UNSUPERVISED DATA DRIFT DETECTION FOR CLASSIFICATION NEURAL NETWORKS

(71) Applicant: Blaize, Inc., El Dorado Hills, CA (US)

(72) Inventors: Adam P. Geringer, Raleigh, CA (US); Val G. Cook, Shingle Springs, CA (US)

(73) Assignee: Blaize, Inc., El Dorado Hills, CA (US)

( * ) Notice: Subject to any disclaimer, the term of this patent is extended or adjusted under 35 U.S.C. 154(b) by 470 days.

(21) Appl. No.: 17/954,410

(22) Filed: Sep. 28, 2022

(65) Prior Publication Data

US 2024/0037923 A1 Feb. 1, 2024

Related U.S. Application Data

(60) Provisional application No. 63/393,429, filed on Jul. 29, 2022.

(51) Int. Cl.
*G06V 10/82* (2022.01)
*G06V 10/75* (2022.01)
*G06V 10/776* (2022.01)

(52) U.S. Cl.
CPC ............ *G06V 10/82* (2022.01); *G06V 10/751* (2022.01); *G06V 10/776* (2022.01)

(58) Field of Classification Search
CPC .... G06V 10/82; G06V 10/751; G06V 10/776; G06N 3/0464
See application file for complete search history.

(56) References Cited

U.S. PATENT DOCUMENTS 8,411,910 B2 * 4/2013 Savvides ............... G06V 40/18
382/117
9,160,760 B2 10/2015 Vasseur et al.
(Continued)

FOREIGN PATENT DOCUMENTS

WO WO-2021167998 A1 * 8/2021 .......... G06F 18/2113

OTHER PUBLICATIONS

Kim, Y., & Park, C. H. An efficient concept drift detection method for streaming data under limited labeling. IEICE Transactions on Information and systems, 100(10), 2537-2546. (Year: 2017).*

(Continued)

*Primary Examiner* — Gregory A Morse
*Assistant Examiner* — Rohan Tejas Mukundhan
(74) *Attorney, Agent, or Firm* — Brian R. Short

(57) ABSTRACT

Methods, systems, and apparatuses for unsupervised data drift detection for classification neural networks are disclosed. One method includes providing the data stream of images to a neural network, generating, by the neural network, class wise probabilities, storing each image of the data stream of images, storing the class wise probabilities generated by the neural network, comparing artifacts of images of the data stream at a first time with artifacts of images of the data stream at a second time, comparing artifacts produced by the class wise probabilities of the data stream retrieved from the stored class wise probabilities at a third time with artifacts produced by the class wise probabilities of the data stream retrieved from the stored class wise probabilities at a fourth time, and generating an informative communication based on the comparisons.

16 Claims, 5 Drawing Sheets

(56) References Cited

U.S. PATENT DOCUMENTS

| | | |
|---|---|---|
| 9,258,217 B2 | 2/2016 | Duffield et al. |
| 2023/0067026 A1* | 3/2023 | Huts .................. G06V 20/00 |

OTHER PUBLICATIONS

Detecting Concept Drift With Neural Network Model Uncertainty, Lucas Baier, Tim Schlor, Jakob Schoffer, Niklas Kuhl, Sep. 23, 2022.

Automatic Learning to Detect Concept Drift, Hang Yu, Tianyu Liu, Jie Lu, Guangquan Zhang, Australian Artificial Intelligence Institute, University of Technology Sydney, May 4, 2021.

Sequential drift detection in deep learning classiers, Samuel Ackerman, Parijat Dube, Eitan Farchi, Sequential drift detection in deep learning, Jul. 31, 2020.

Unsupervised Model Drift Estimation with Batch Normalization Statistics for Dataset Shift Detection and Model Selection, Wonju Lee, Seok-Yong Byun, Jooeun Kim, Minje Par, Kirill Chechil, Jul. 1, 2021.

* cited by examiner

UNSUPERVISED DATA DRIFT DETECTION FOR CLASSIFICATION NEURAL NETWORKS

RELATED APPLICATIONS

This patent application claims priority to U.S. Patent Provisional Application Ser. No. 63/393,429, filed Jul. 29, 2022, which is herein incorporated by reference.

FIELD OF THE EMBODIMENTS

The described embodiments relate generally to computer processing. More particularly, the described embodiments relate to methods, apparatuses, and systems for unsupervised data drift detection for classification neural networks.

BACKGROUND

Artificial neural networks (ANN) are computing systems inspired by biological neural networks in the human brain. ANN consists of nodes ("neurons") that are pairwise connected by vertices ("synapses"). Each node has a state characterized by a real number, usually in the range from 0.0 to 1.0, and each connection has a strength characterized by a real number. Usually, the nodes are organized in layers in such a way that no two nodes within same the layer are connected, and connections only exist between nodes from different layers. of the ANN topology and hyperparameters as the ANN architecture.

It is desirable to have a method, apparatus, and system for unsupervised data drift detection for classification neural networks.

SUMMARY

One embodiment includes a method for sensing a data stream of images. The method includes providing the data stream of images to a neural network, generating, by the neural network, class wise probabilities, storing each image of the data stream of images in a first database, storing the class wise probabilities generated by the neural network in a second database, comparing artifacts of images of the data stream at a first time with artifacts of images of the data stream at a second time, comparing artifacts produced by the class wise probabilities of the data stream retrieved from the stored class wise probabilities at a third time with artifacts produced by the class wise probabilities of the data stream retrieved from the stored class wise probabilities at a fourth time, and generating an informative communication based on the compared artifacts of images of the data stream at the first time with artifacts of images of the data stream at the second time, and based on the compared artifacts produced by the class wise probabilities of the data stream retrieved from the stored class wise probabilities at a third time with artifacts produced by the class wise probabilities of the data stream retrieved from the stored class wise probabilities at a fourth time.

Another embodiment includes a system for detection of unsupervised data drift. The system includes an image sensor and a processor. The image sensor is configured to senses a data stream of images. The processor is configured to receive the data stream of images, provide the data stream of images to a neural network, and the neural network is configured to generate class wise probabilities. The processor is further configured to store each image of the data stream of images in a database, store the class wise probabilities generated by the neural network, compare artifacts of images of the data stream at a first time with artifacts of images of the data stream at a second time, compare artifacts produced by the class wise probabilities of the data stream retrieved from the stored class wise probabilities at a third time with artifacts produced by the class wise probabilities of the data stream retrieved from the stored class wise probabilities at a fourth time, and generate an informative communication based on the compared artifacts of images of the data stream at the first time with images of the data stream at the second time and based on the compared images of the data stream retrieved from the stored class wise probabilities at the third time with images of the data stream retrieved from the stored class wise probabilities at the fourth time.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in methods, apparatuses, and systems for unsupervised data drift detection for classification neural networks. The abundance of data and information require artificial intelligence models to be more intelligent, flexible, and resilient despite changes in data, technical requirements, or fatigue of performance due to change in the environment. However, modern infrastructure and hardware do not fully take these phenomena into account, and frequently well-performing models must undergo costly and time-consuming retrains or be discarded in favor of developing new one. In addition, there is currently no unified platform that can manage these changes. At least some of the described embodiments operate to detect data drift of data being input to classification neural networks. The embodiments for data drift do not need human supervision and operate to generate an informative communication which a human operator may receive.

For an embodiment, the classification neural network includes N binary neurons leading to multi-class classification. In practice, the last layer of a neural network is usually a softmax function layer, which is the algebraic simplification of N logistic classifiers, normalized per class by the sum of the N−1 other logistic classifiers. While the described embodiments may include a classification neural network, it is to be understood that other types of neural networks, can also benefit from the described embodiments for unsupervised data drift detection.

Figure 1:
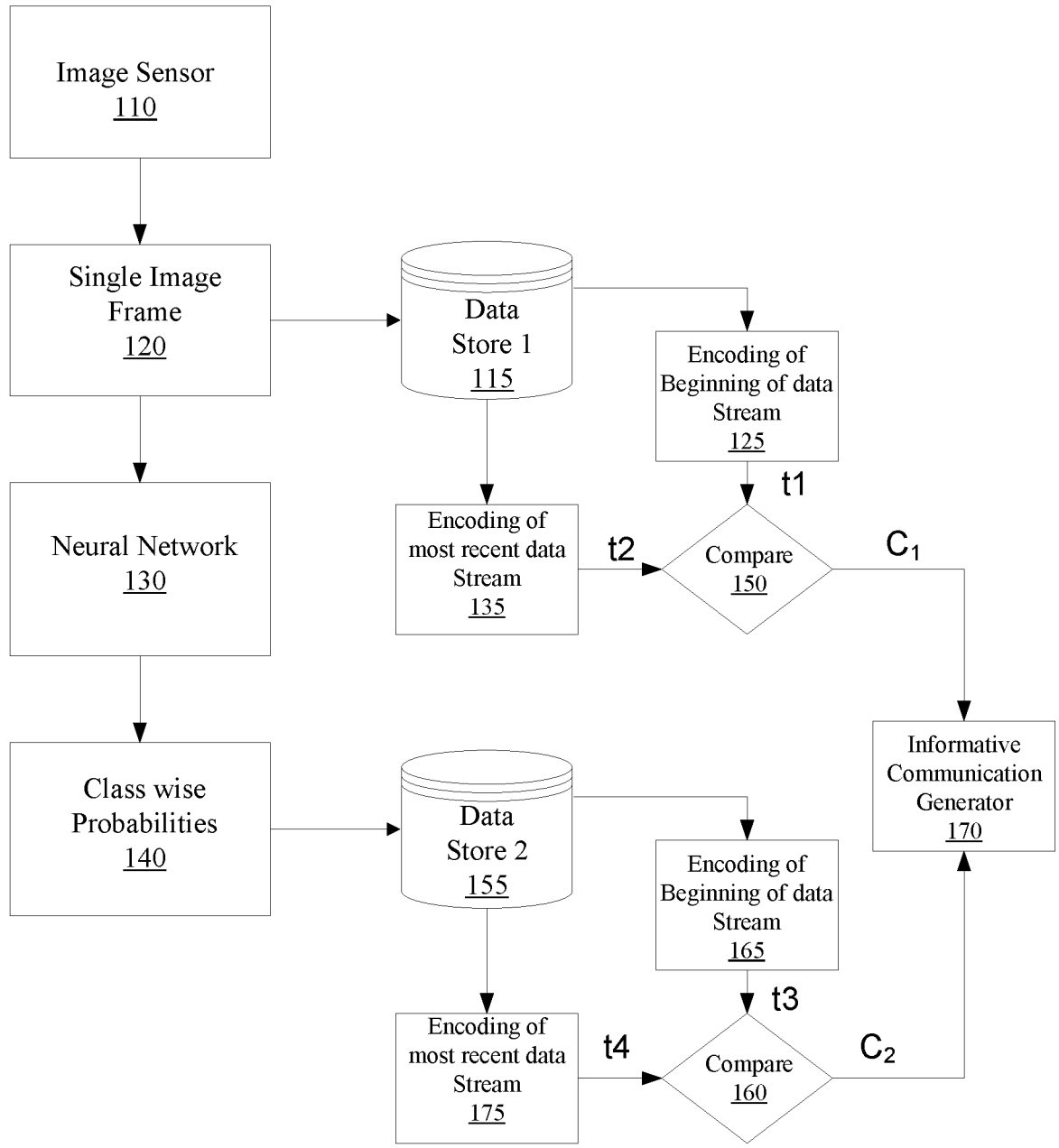
FIG. 1 shows a block diagram of a system for detecting unsupervised data drift of a neural network, according to an embodiment.

FIG. 1 shows a block diagram of a system for detecting unsupervised data drift of a neural network, according to an embodiment. An image sensor 110 is configured to sense a stream of images. For an embodiment, the image sensor 110 includes a bitmap.

For an embodiment, the sensed image is turned into a bit map. For other embodiments, the bit map is alternatively received from elsewhere. For an embodiment, the bit map is converted into a tensor of an expected shape as defined by the input layer of a neural network 130.

For an embodiment, the image sensor 110 includes a camera. For various other embodiments, the images are received from the internet, a direct source, or an on-board camera. For an embodiment, the image sensors generate and provide either a stream of compressed video or frame by frame images.

For an embodiment, a single image frame 120 is configured to receive the stream of images from the image sensor 110. For an embodiment, the single image frame includes a sample of the camera feed or data stream at a given time. For various embodiments, this includes any digital format, such as, RGB, Bayer, Grayscale, etc. For an embodiment, this includes whatever the processing of the neural network 130 is designed to accept.

For an embodiment, the neural network 130 receives the stream of sensed images. For an embodiment, the neural network 130 operates on a finite set of images. For an embodiment, the input is a single image. For an embodiment, the single image has a shape and size that is compatible with the input layer of the neural network 130.

The neural network 130 receives the output from the single image frame 120 or the stream of digital images. For an embodiment, the neural network 130 includes a Convolutional Neural Network that makes classification decisions on an entire input image. Exemplary Convolution Neural Networks include Resnet, VGG, Inception, etc. For an embodiment, the Convolutional Neural Network (CNN) includes a Deep Learning algorithm which can take in an input image, assign importance (learnable weights and biases) to various aspects/objects in the image(s), and be able to differentiate one from the other. The preprocessing required in a CNN is much lower as compared to other classification algorithms. While in primitive methods filters are hand-engineered, with enough training, CNNs have the ability to learn these filters/characteristics. For an embodiment, the architecture of a CNN is analogous to that of the connectivity pattern of Neurons in the Human Brain and was inspired by the organization of the Visual Cortex. Individual neurons respond to stimuli only in a restricted region of the visual field known as the Receptive Field. A collection of such fields overlaps to cover the entire visual area.

For an embodiment, a class wise probabilities 140 receives an output from the neural network 130. For an embodiment, the output of the neural network 130 is in a raw format. For an embodiment, this is generally a list of numbers with length an equal number of classes. For an embodiment, the class wise probabilities are fed into, for example, Softmax to get the highest-class probability. For an embodiment, Softmax is a mathematical function that converts a vector of numbers into a vector of probabilities, where the probabilities of each value are proportional to the relative scale of each value in the vector. For an embodiment, a LogSumExp (LSE) (also called RealSoftMax or multivariable softplus) function is used to generate the class wise probabilities for each class. For an embodiment, the LSE includes a smooth maximum or a smooth approximation to a maximum function and can be defined as a logarithm of a sum of exponentials of arguments.

For an embodiment, the class wise probabilities are the final output layer of the neural network 130 from an input wherein the probabilities are calculated by exponentiation of each value in the output array (output layer weighted times the values from a previous layer). For an embodiment, the output layer creates an output array.

For an embodiment, each image of the data stream of images is stored in a first database (data store 1 115). For an embodiment, the first database (first data store 1 115) is configured to store the image frames from the data stream for auditing and re-labeling purposes.

A step 125 includes encoding a beginning of the data stream. For an embodiment, this includes at the beginning of the data stream, encoding the first N number of images that are used for inference within the neural network 130. For an embodiment, this includes saving JPEG (Joint Picture Experts Group) images in a stack or compressing the JPEG images into other artifacts derived non-linearly, such as, output logits of a generalized neural network. A JPEG image is a standard image format for containing lossy and compressed image data. Despite the huge reduction in file size JPEG images maintain reasonable image quality. For an embodiment, N is a preselected value that may be selected based on capturing an aspect of a rolling average of how the stream changes over time. For an embodiment, enough samples (N) are used such that small changes do not adversely generate alerts.

A step 135 includes encoding of a most recent of the data stream. For an embodiment, the same number of images (N) are collected and the same encoding method as used in step 125 is used to capture the most recent image (images k, k−1, k−2, k−3, . . . , k−n). For an embodiment, this includes the most recent N images.

A compare 150 step includes comparing outputs of the encoding of the beginning of the data stream of step 125 with encoding of the most recent of the data stream of step 135. For an embodiment, the beginning of the data stream of step 125 is compared to the end of the data stream of step 135. For an embodiment, this includes comparing artifacts of images of the data stream at a first time t1 with artifacts of images of the data stream at a second time t2. For an embodiment, it is the artifacts that are produced and compared. For an embodiment, the artifacts are determined by the specific encoding used. For an embodiment, there is a number of encodings that generate the number of artifacts. For an embodiment, this includes performing a Linear Interpolation Distance encodings between the two stacks of images, or perhaps something more complex such as Frechet Interpolation Distance.

For an embodiment, the compare 150 provides a first indicator $C_1$ of data drift. Accordingly, the output $C_1$ of the compare 150 is input to an informative communication generator 170 that is configured to generate an output or alert that data drift of a currently operating model of the neural network 130 has occurred.

A second data store 2 155 is configured to store the neural network output of class wise probabilities. For an embodiment, this includes storing output tensors.

A step 165 includes encoding of model behavior at the beginning of the data stream. For an embodiment, this is similar as before, except the class wise probabilities are summarized, not the images themselves. For an embodiment, this includes an average confidence of the most probable classifications of the first N images. For an embodiment, this includes a summary of the output decisions for the most first probable classifications of the N images.

A step 175 includes encoding of model behavior on the most recent data stream. As before, this encoding is the same as used for the beginning of the data-stream. For an embodiment, this includes an average confidence of the most recent N images. For an embodiment, this includes a summary (For example, % true versus % false if there are two classes. However, other numbers of classes are possible) of the output decisions for the most recent N images.

A compare 160 step includes comparing the output of step 165 with the output of step 175. That is, the two encoding are compared and a compare output $C_2$. For an embodiment, this includes comparing artifacts produced by the class wise probabilities of the data stream retrieved from the stored class wise probabilities at a third time t3 with artifacts produced by the class wise probabilities of the data stream retrieved from the stored class wise probabilities at a fourth time t4.

For the described embodiments, the third time may be the same as the first times. Further, for the described embodiments, the fourth time may be the same as the second time.

For an embodiment, if there is a large discrepancy (greater than a discrepancy threshold) between the two encodings, an alert is generated. For an embodiment, it can be determined that the drift of the stream of images may cause the model in production (that is, the model currently operating in the neural network 130) to be less confident, or is simply biased, and may not be functioning correctly.

For an embodiment, the compare 160 provides a second indicator $C_2$ of data drift. Accordingly, the output $C_2$ of the compare 160 is input to an informative communication generator 170 that is configured to generate an output when the data drift has occurred.

For an embodiment, the informative communication generator 170 is configured to generate an informative indicator based on the inputs ($C_1$, $C_2$) provided by the compare 150 and the compare 160. For an embodiment, the informative communication generator 170 "OR" functions the inputs ($C_1$, $C_2$). That is, if one of the inputs indicates a data drift, then the informative communication generator 170 generate an output indicating data drift of the model of the neural network 130. For an embodiment, the informative communication generator 170 "AND" functions the inputs ($C_1$, $C_2$). That is, if both inputs ($C_1$, $C_2$) indicate a data drift, then the informative communication generator 170 generates an output indicating data drift of the model of the neural network 130. As will be described, for an embodiment the output of the informative communication generator 170 is based on a weighted combinations of the inputs ($C_1$, $C_2$) to the informative communication generator 170. For an embodiment, the informative communication generator 170 generates an output that indicates data drift of the model currently operating within the neural network 130 when the weighted combination of the inputs exceeds a predetermined threshold value.

Figure 2:
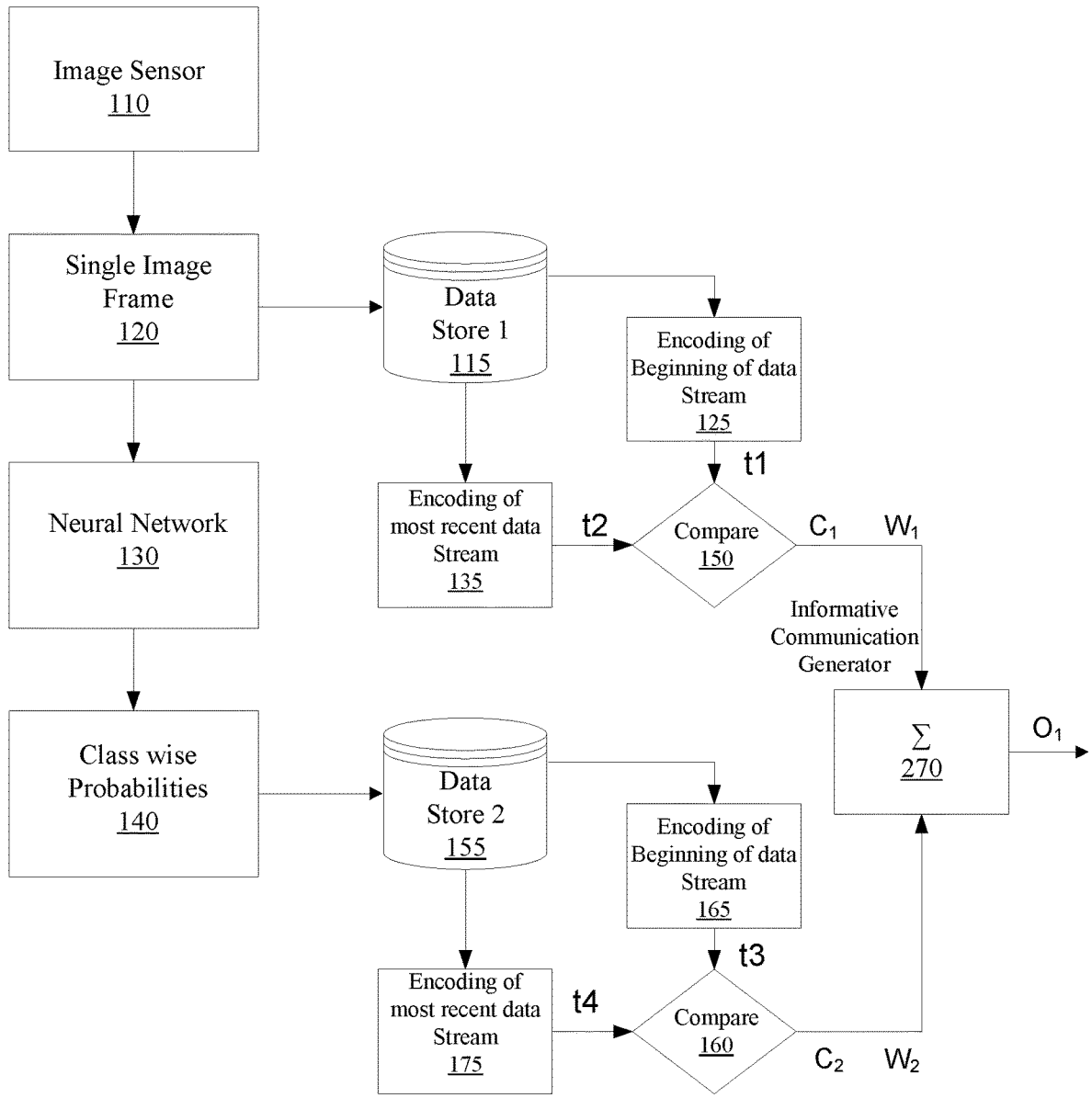
FIG. 2 shows a block diagram of a system for detecting unsupervised data drift of a neural network, according to another embodiment.

FIG. 2 shows for detecting unsupervised data drift of a neural network, according to another embodiment. As shown, for an embodiment, the output $C_1$ of the compare 150 is weighted by W1 and the output $C_2$ of the compare 160 is weighted W2.

For this embodiment, the informative communication generator receives and sums the weighted encoding outputs. That is, the output $O_1$ of the informative communication generator 270 is determined as:

$$O_1 = \Sigma C_i W_i = C_1 W_1 + C_2 W_2$$

For an embodiment, if the weighted sum $O_1$ is greater than a threshold, then the information communication generator generates an alert that data drift greater than a threshold has occurred. For an embodiment, the weights W1, W2 of the weighted combination are adaptively adjusted. For an embodiment, the weights W1, W2 are adaptively adjusted based on a value V1 of the compared artifacts $C_1$ of images of the data stream at the first time t1 with artifacts of images of the data stream at the second time t2 and based on a value V2 of the compared images $C_2$ of the data stream retrieved from the stored class wise probabilities at a third time t3 with images of the data stream retrieved from the stored class wise probabilities at a fourth time t4. For an embodiment, one of the weights W1, W2 is greatest based on which of the values V1, V2 are relatively greater.

For an embodiment, a one of the weights W1, W2, is greatest based on which of the values V1, V2 is relatively more important. Importance can be estimated based on the value of the weight. For an embodiment, historical monitoring/measuring is used to initialize and adaptively adjust the weights over time. For an embodiment, a user (human) feedback over time is used to estimate which of the weights should have more or less value.

Figure 3:
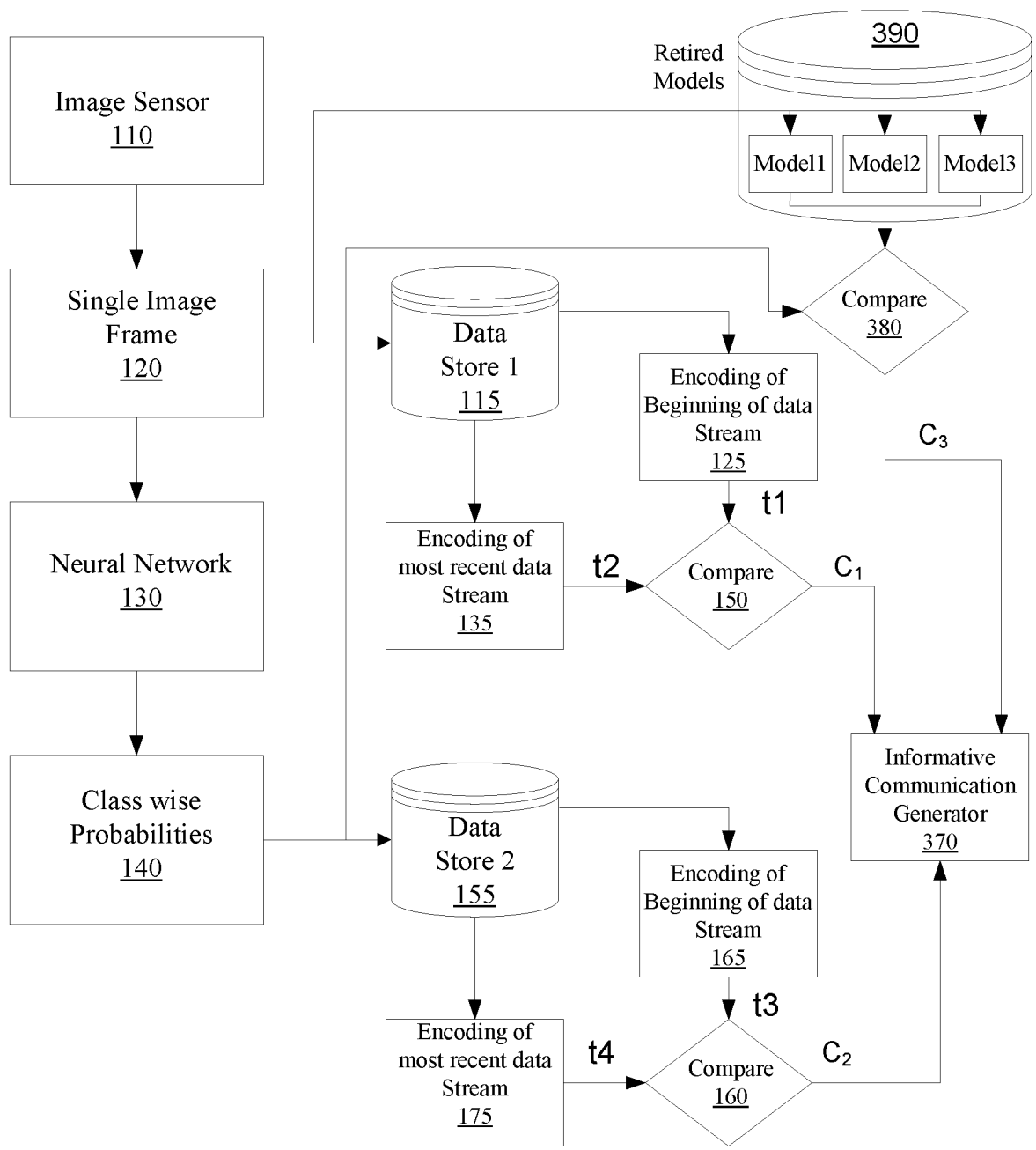
FIG. 3 shows a block diagram of a system for detecting unsupervised data drift of a neural network, according to another embodiment.

FIG. 3 shows for detecting unsupervised data drift of a neural network, according to another embodiment. FIG. 3 additionally includes a retired model database 390 of retired models (Model 1, Model 2, Model 3). For an embodiment, the one or more retired models include models of the neural network 130 that were previously used.

For an embodiment, a machine learning model includes a file that has been trained to recognize certain types of patterns. For an embodiment, the machine learning model can be trained over a set of data, providing the machine learning model with an algorithm that it can use to reason over and learn from the set of data.

For an embodiment, as models are retired due to data drift or other MLops (machine learning operations) reasons, the usefulness of the models may have decreased, but the retired models can still be used for other purposes. Since the models were trained to do a task that is still being performed by a currently operating model of the neural network 130, the retired models can be saved in a repository for usage to enable comparing of operation of the current model with operation of the previous (retired) models. That is, for an embodiment, the retired models can be used for detection of data drift of the currently operating models of the neural network 130.

For an embodiment, the data stream (same image frame(s)) that are being provided to the neural network 130 to run inference and make decisions and perform an action are also input to the retired models (Model 1, Model 2, Model 3) of the retired model database 390. The same data stream and images are processed by the retired models to generate outputs, wherein the outputs provide alternate class wise probabilities as the neural network 130. For an embodiment, outputs of the multiply models are multiplied by 1–n by weights 1–n, to compare to the results of the model in use by the neural network 130. This can be performed after the model in use has performed its action. The weighting of the models can be, for example, based on a recency of retirement of each of the retired models. For example, the most recently retired model could be assigned the greatest weight and the least recently retired model could be assigned the lowest weight. For at least some other embodiment, other parameters can be used for the weighting. Such embodiments can include reducing the weighting of models that deviate the greatest (or greater than a threshold) from a majority of the other models.

At least some embodiments include providing the data stream of images to one or more retired neural network models of the retired model database. Further, at least some embodiments include comparing (380) outputs of the one or more retired network models with outputs of the class wise probabilities. For an embodiment, the compared (380) output $C_3$ is provided to the informative communication generator 370 to aid in the decision regarding data drift. As shown, the compare 380 generates the compare output $C_3$.

That is, for an embodiment, the results of the current model are compared to results of the retired models. For an embodiment, it can be determined that the current model(s) may not be functioning correctly if there is a wide discrepancy (greater than a selected threshold) between the current models and the retired models. In certain cases, a disagreement can be used as evidence that the current model(s) have overcome some of the previous challenges caused by data drift as, for example, suffered by the retired models. For an embodiment, the informative communication of the informative communication generator 370 is generated further based on the compared outputs of the one or more retired network models with outputs of the class wise probabilities.

For an embodiment, the informative communication generator 370 is configured to generate an informative indicator based on the inputs ($C_1$, $C_2$, $C_3$) provided by the compare 150, the compare 160, and the compare 380. For an embodiment, the informative communication generator 170 "OR" functions the inputs ($C_1$, $C_2$, $C_3$). That is, if one of the inputs ($C_1$, $C_2$, $C_3$) indicates a data drift, then the informative communication generator 170 generate an output indicating data drift of the model of the neural network 130. For an embodiment, the informative communication generator 170 "AND" functions the inputs ($C_1$, $C_2$, $C_3$). That is, if all of the inputs ($C_1$, $C_2$, $C_3$) indicate a data drift, then the informative communication generator 170 generates an output indicating data drift of the model of the neural network 130. As will be described, for an embodiment the output of the informative communication generator 170 is based on a weighted combination of the inputs to the informative communication generator 170. For an embodiment, the informative communication generator 170 generates an output that indicates data drift of the model currently operating within the neural network 130 when the weighted combination of the inputs ($C_1$, $C_2$, $C_3$) exceeds a predetermined threshold value.

Figure 4:
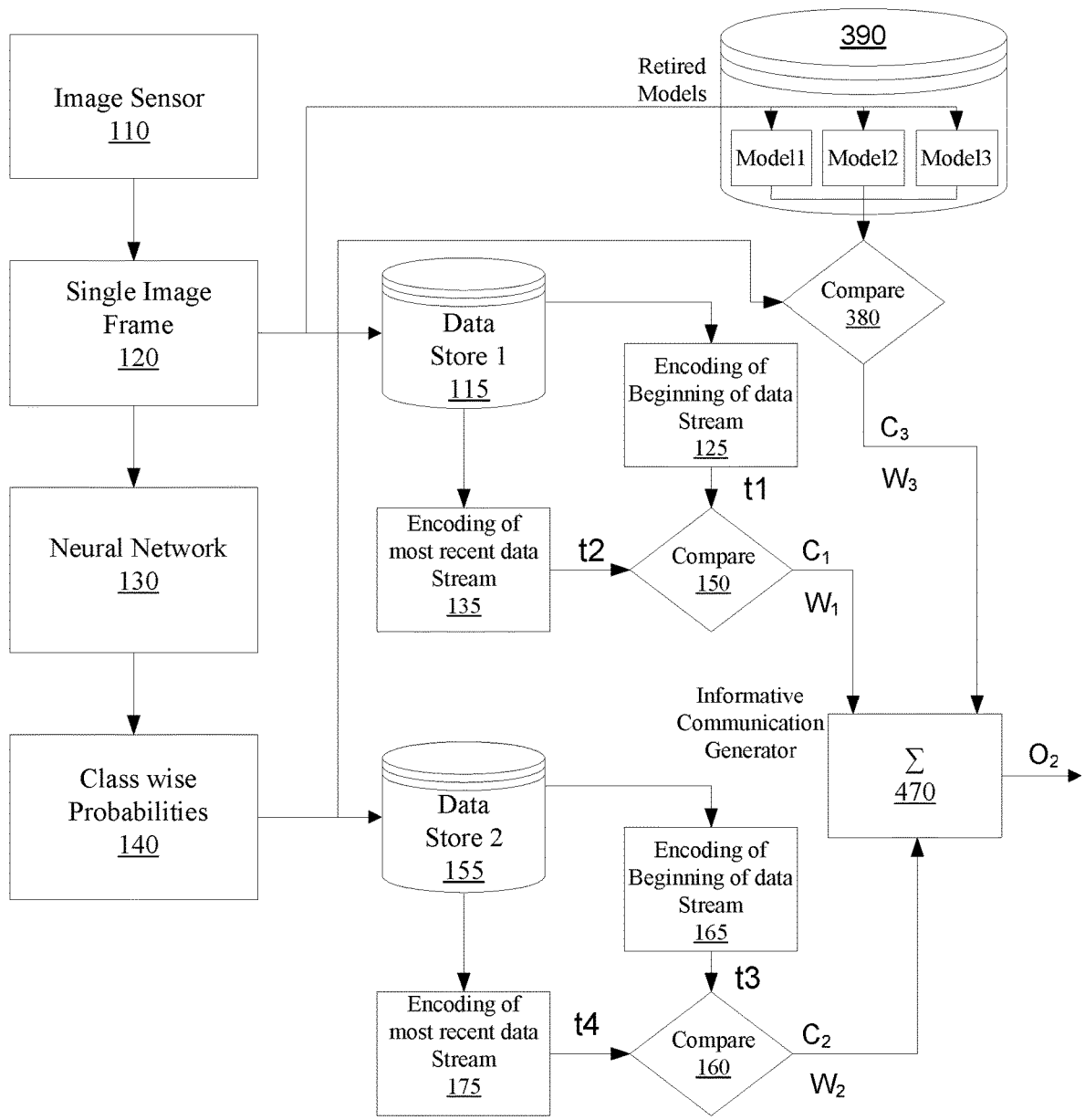
FIG. 4 shows a block diagram of a system for detecting unsupervised data drift of a neural network, according to another embodiment.

FIG. 4 shows for detecting unsupervised data drift of a neural network, according to another embodiment. For this embodiment, the informative communication generator 470 receives and sums the weighted (W1, W2, W3) outputs. For an embodiment, if the weighted sum is greater than a threshold, then the information communication generator generates an alert that data drift greater than a threshold has occurred.

For this embodiment, the informative communication generator receives and sums the weighted encoding outputs. That is, the output $O_2$ of the informative communication generator 470 is determined as:

$$O_2 = \Sigma C_i W_i = C_1 W_1 + C_2 W_2 + C_3 W_3$$

For an embodiment, if the weighted sum 02 is greater than a threshold, then the information communication generator generates an alert that data drift greater than a threshold has occurred. For an embodiment, the weights W1, W2, W3 of the weighted combination are adaptively adjusted. For an embodiment, the weights W1, W2, W3 are adaptively adjusted based on a value V1 of the compared $C_1$ artifacts of images of the data stream at the first time with artifacts of images of the data stream at the second time, based on a value V2 of the compared $C_2$ artifacts produced by the class wise probabilities of the data stream retrieved from the stored class wise probabilities at a third time with artifacts produced by the class wise probabilities of the data stream retrieved from the stored class wise probabilities at a fourth time, and based on a value V3 of the compared outputs $C_3$ of the one or more retired network models with outputs of the class wise probabilities.

For an embodiment, a one of the weights W1, W2, W3 is greatest based on which of the values V1, V2, V3 are relatively more important. Importance can be estimated based on the value of the weight. Historical monitoring/measuring—used to initialize and adaptively adjust the weights over time. Use the user (human) feedback over time to estimate which of the weights should have more or less value.

Figure 5:
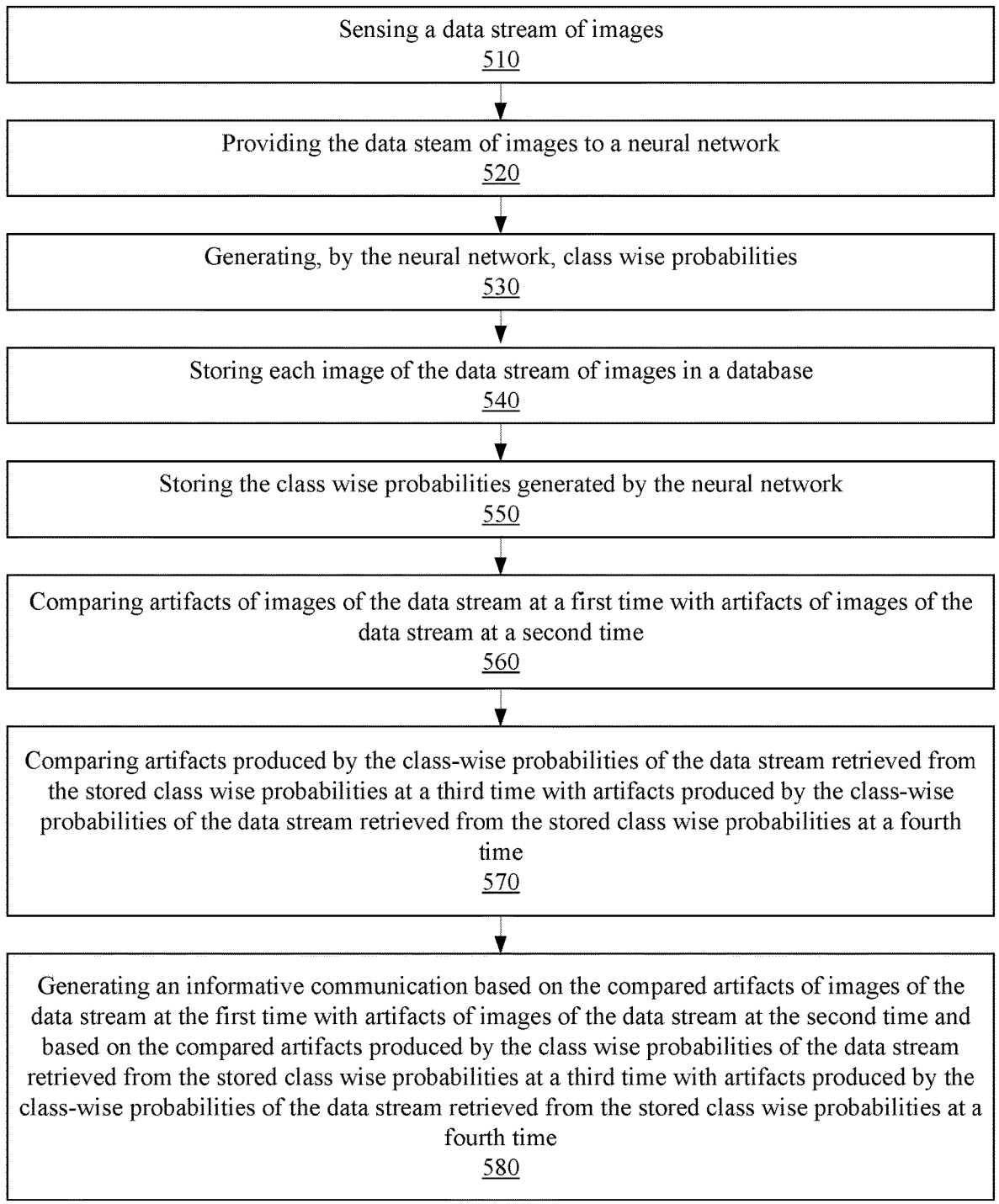
FIG. 5 is a flow chart that includes steps of a method for detecting unsupervised data drift of a neural network, according to an embodiment.

FIG. 5 is a flow chart that includes steps of a method for detecting unsupervised data drift of a neural network, according to an embodiment. A first step 510 includes sensing a data stream of images (could be generating a bit-map based on a sensed image). As previously described, for an embodiment, a single image frame 120 is configured to receive the stream of images from the image sensor 110. For an embodiment, the single image frame includes a sample of the camera feed or data stream at a given time. For various embodiments. this includes any digital format, such as, RGB, Bayer, Grayscale, etc. For an embodiment, this includes whatever the processing of the neural network 130 is designed to accept.

A second step 520 includes providing the data stream of images to a neural network. A third step 530 includes generating, by the neural network, class wise probabilities. A fourth step 540 includes storing each image of the data stream of images in a first database. A fifth step 550 includes storing the class wise probabilities generated by the neural network in a second database. A sixth step 560 includes comparing artifacts of images of the data stream at a first time with artifacts of images of the data stream at a second time. As previously described, for an embodiment, the artifacts are determined by the specific encoding used. For an embodiment, there are a number of encodings that generate the number of artifacts). For an embodiment, this includes performing a Linear Interpolation Distance between the two stacks of image encodings, or perhaps something more complex such as Frechet Interpolation Distance.

A seventh step 570 includes comparing artifacts produced by the class wise probabilities of the data stream retrieved from the stored class wise probabilities at a third time with artifacts produced by the class wise probabilities of the data stream retrieved from the stored class wise probabilities at a fourth time. An eighth step 580 includes generating an informative communication based on the compared artifacts of images of the data stream at the first time with artifacts of images of the data stream at the second time and based on the compared artifacts produced by the class wise probabilities of the data stream retrieved from the stored class wise probabilities at a third time with artifacts produced by the class wise probabilities of the data stream retrieved from the stored class wise probabilities at a fourth time.

It is to be understood that for at least some embodiments, the third time and the first time are the same. Further, for an embodiment, the fourth time and the second time are the same.

For at least some embodiments, the informative communication is generated when the compared artifacts of images of the data stream at the first time with artifacts of images of the data stream at the second time is greater than the first change threshold, or the compared artifacts produced by the class wise probabilities of the data stream retrieved from the stored class wise probabilities at a third time with artifacts produced by the class wise probabilities of the data stream retrieved from the stored class wise probabilities at a fourth time is greater than a second change threshold.

For at least some embodiments, the informative communication is generated when the compared artifacts of images of the data stream at the first time with artifacts of images of the data stream at the second time is greater than the first change threshold, and the compared artifacts produced by the class wise probabilities of the data stream retrieved from the stored class wise probabilities at a third time with artifacts produced by the class wise probabilities of the data stream retrieved from the stored class wise probabilities at a fourth time is greater than a second change threshold.

For at least some embodiments, the informative communication is generated when a weighted combination of a weight W1 of the compared artifacts of images of the data stream at the first time with artifacts of images of the data stream at the second time, and a weight W2 of the compared artifacts produced by the class wise probabilities of the data stream retrieved from the stored class wise probabilities at a third time with artifacts produced by the class wise probabilities of the data stream retrieved from the stored class wise probabilities at a fourth time, is greater than a weighted threshold. For an embodiment, the weights W1, W2 of the weighted combination are adaptively adjusted. For an embodiment, the weights W1, W2 are adaptively adjusted based on a value V1 of the compared artifacts of images of the data stream at the first time with artifacts of images of the data stream at the second time and based on a value V2 of the compared images of the data stream retrieved from the stored class wise probabilities at a third time with images of the data stream retrieved from the stored class wise probabilities at a fourth time. For an embodiment, a one of the weights W1, W2 is greatest based on which of the values V1, V2 are relatively greater. That is, for example, if one of the comparisons is large (greater than an extreme threshold) then that comparison can be weighted much greater than the other.

An embodiment further includes encoding the images of the data stream at the first time and encoding the images of the data stream at the second time before comparing, wherein the encoding provides the artifacts of images of the data stream at the first time with images of the data stream at the second time. As previously described, for an embodiment, the artifacts are determined by the specific encoding used. For an embodiment, there are a number of encodings that generate the number of artifacts). For an embodiment, this includes performing a Linear Interpolation Distance between the two stacks of image encodings, or perhaps something more complex such as Frechet Interpolation Distance.

For an embodiment, the comparing of artifacts of the images includes determining linear interpolation distances between stacks of the encoded images.

For an embodiment, the change threshold is selected to indicate that the data stream of images has drifted to a point in which the neural network is not operating properly. For an embodiment, the neural network not operating properly includes the neural network falsely classifying data. For an embodiment, the neural network not operating properly includes the neural network making incorrect classifications. For an embodiment, the neural network not operating properly includes the neural network making incorrect decisions.

For an embodiment, the informative communication provides an alert to a system operator that models of the neural network need to be updated.

At least some embodiments further include providing the data stream of images to one or more retired neural network models and comparing outputs of the one or more retired network models with outputs of the class wise probabilities, wherein the informative communication is generated further based on the compared outputs of the one or more retired network models with outputs of the class wise probabilities.

For an embodiment, the informative communication is generated when the compared artifacts of images of the data stream at the first time with artifacts of images of the data stream at the second time is greater than the first change threshold, the compared artifacts produced by the class wise probabilities of the data stream retrieved from the stored class wise probabilities at a third time with artifacts produced by the class wise probabilities of the data stream retrieved from the stored class wise probabilities at a fourth time is greater than a second change threshold, or the compared outputs of the one or more retired network models with outputs of the class wise probabilities is greater than a third change threshold.

For an embodiment, the informative communication is generated when the compared artifacts of images of the data stream at the first time with artifacts of images of the data stream at the second time is greater than the first change threshold, the compared artifacts produced by the class wise probabilities of the data stream retrieved from the stored class wise probabilities at a third time with artifacts produced by the class wise probabilities of the data stream retrieved from the stored class wise probabilities at a fourth time is greater than a second change threshold, and the compared outputs of the one or more retired network models with outputs of the class wise probabilities is greater than a third change threshold.

For an embodiment, the informative communication is generated when a weighted combination of a weight W1 of the compared artifacts of images of the data stream at the first time with artifacts of images of the data stream at the second time, a weight W2 of the compared artifacts produced by the class wise probabilities of the data stream retrieved from the stored class wise probabilities at a third time with artifacts produced by the class wise probabilities of the data stream retrieved from the stored class wise probabilities at a fourth time, and a weight W3 of the compared outputs of the one or more retired network models with outputs of the class wise probabilities. For an embodiment, the weights W1, W2, W3 of the weighted combination are adaptively adjusted.

For an embodiment, the weights W1, W2, W3 are adaptively adjusted based on a value V1 of the compared artifacts of images of the data stream at the first time with artifacts of images of the data stream at the second time, based on a value V2 of the compared artifacts produced by the class wise probabilities of the data stream retrieved from the stored class wise probabilities at a third time with artifacts produced by the class wise probabilities of the data stream retrieved from the stored class wise probabilities at a fourth time, and based on a value V3 of the compared outputs of the one or more retired network models with outputs of the class wise probabilities. For an embodiment, one of the weights W1, W2, W3 is greatest based on which of the values V1, V2, V3 are relatively greater.

As previously described, for an embodiment the one or more retired models comprise models of the neural network that were previously used.

As previously described, for an embodiment, as models are retired due to data drift or other MLops (machine learning operations) reasons, the usefulness of the models may have decreased, but the retired models can still be used for other purposes. Since the models were trained to do a task that is still being performed, the retired models can be saved in a repository for usage to compare the current model with the previous (retired) models. That is, the retired models can be used for detection of data drift of the currently operating models of the neural network 130.

As previously described, for an embodiment, the data stream (same image frame(s)) that are being provided to the neural network to run inference and make decisions and perform an action are also input to the retired models (Model 1, Model 2, Model 3) of the retired model database 390. The same data stream and images are processed by the retired models to generate outputs, wherein the outputs provide alternate class wise probabilities as the neural network 130. For an embodiment, outputs of the multiply models are multiplied by 1–n by weights 1–n, to compare to the results of the model in use by the neural network 130. This can be performed after the model in use has performed its action. The weighting of the models can be, for example, based on a recency of retirement of each of the retired models. For example, the most recently retired model could be assigned the greatest weight and the least recently retired model could be assigned the lowest weight. For at least some other embodiment, other parameters can be used for the weighting. Such embodiments can include reducing the weighting of models that deviate the greatest (or greater than a threshold) from a majority of the other models.

As previously described, at least some embodiments include providing the data stream of images to one or more retired neural network models of the retired model database. Further, at least some embodiments include comparing (380) outputs of the one or more retired network models with outputs of the class wise probabilities. For an embodiment, the compared (380) outputs as provided to the informative communication generator 170 to aid in the decision regarding data drift.

For an embodiment, the results of the current model are compared to results of the retired models. For an embodiment, it can be determined that the current model(s) may not be functioning correctly if there is a wide discrepancy (greater than a selected threshold) between the current models and the retired models. In certain cases, a disagreement can be used as evidence that the current model(s) have overcome some of the previous challenges caused by data drift as, for example, suffered by the retired models. For an embodiment, the informative communication is generated further based on the compared outputs of the one or more retired network models with outputs of the class wise probabilities.

Although specific embodiments have been described and illustrated, the described embodiments are not to be limited to the specific forms or arrangements of parts so described and illustrated. The embodiments are limited only by the appended claims.

What is claimed:

1. A method, comprising:
   sensing a data stream of images;
   providing the data stream of images to a neural network;
   generating, by the neural network, class wise probabilities;
   storing each image of the data stream of images in a first database;
   storing the class wise probabilities generated by the neural network in a second database;
   comparing artifacts of images of the data stream at a first time with artifacts of images of the data stream at a second time;
   comparing artifacts produced by the class wise probabilities of the data stream retrieved from the stored class wise probabilities at a third time with artifacts produced by the class wise probabilities of the data stream retrieved from the stored class wise probabilities at a fourth time; and
   generating an informative communication based on the compared artifacts of images of the data stream at the first time with artifacts of images of the data stream at the second time and based on the compared artifacts produced by the class wise probabilities of the data stream retrieved from the stored class wise probabilities at a third time with artifacts produced by the class wise probabilities of the data stream retrieved from the stored class wise probabilities at a fourth time;
   wherein the informative communication is generated when a weighted combination of a weight W1 of the compared artifacts of images of the data stream at the first time with artifacts of images of the data stream at the second time, and a weight W2 of the compared artifacts produced by the class wise probabilities of the data stream retrieved from the stored class wise probabilities at a third time with artifacts produced by the class wise probabilities of the data stream retrieved from the stored class wise probabilities at a fourth time, is greater than a weighted threshold.

2. The method of claim 1, wherein the weights W1, W2 of the weighted combination are adaptively adjusted.

3. The method of claim 2, wherein the weights W1, W2 are adaptively adjusted based on a value V1 of the compared artifacts of images of the data stream at the first time with artifacts of images of the data stream at the second time and based on a value V2 of the compared images of the data stream retrieved from the stored class wise probabilities at a third time with images of the data stream retrieved from the stored class wise probabilities at a fourth time.

4. The method of claim 3, wherein a one of the weights W1, W2 is greatest based on which of the values V1, V2 is relatively greater.

5. The method of claim 1, further comprising encoding the images of the data stream at the first time and encoding the images of the data stream at the second time before comparing, wherein the encoding provides the artifacts of images of the data stream at the first time with images of the data stream at the second time.

6. The method of claim 1, wherein the comparing artifacts of the images includes determining linear interpolation distances between stacks of encoded images.

7. The method of claim 1, wherein the informative communication provides an alert to a system operator that models of a neural network need to be updated.

8. The method of claim 1, further comprising:
   providing the data stream of images to one or more retired neural network models; and
   comparing outputs of the one or more retired network models with outputs of the class wise probabilities;
   wherein the informative communication is generated further based on the compared outputs of the one or more retired neural network models with outputs of the class wise probabilities.

9. The method of claim 8, wherein the informative communication is generated when the compared artifacts of images of the data stream at the first time with artifacts of images of the data stream at the second time is greater than the first change threshold, the compared artifacts produced by the class wise probabilities of the data stream retrieved from the stored class wise probabilities at a third time with artifacts produced by the class wise probabilities of the data stream retrieved from the stored class wise probabilities at a fourth time is greater than a second change threshold, or the compared outputs of the one or more retired network models with outputs of the class wise probabilities is greater than a third change threshold.

10. The method of claim 9, wherein the informative communication is generated when a weighted combination of the weight W1 of the compared artifacts of images of the data stream at the first time with artifacts of images of the data stream at the second time, the weight W2 of the compared artifacts produced by the class wise probabilities of the data stream retrieved from the stored class wise probabilities at a third time with artifacts produced by the class wise probabilities of the data stream retrieved from the stored class wise probabilities at a fourth time, and a weight W3 of the compared outputs of the one or more retired network models with outputs of the class wise probabilities is greater than a third change threshold.

11. The method of claim 10, wherein the weights W1, W2, W3 of the weighted combination are adaptively adjusted.

12. The method of claim 11, wherein the weights W1, W2, W3 are adaptively adjusted based on a value V1 of the compared artifacts of images of the data stream at the first time with artifacts of images of the data stream at the second time, based on a value V2 of the compared artifacts produced by the class wise probabilities of the data stream retrieved from the stored class wise probabilities at a third time with artifacts produced by the class wise probabilities of the data stream retrieved from the stored class wise probabilities at a fourth time, and based on a value V3 of the compared outputs of the one or more retired network models with outputs of the class wise probabilities.

13. The method of claim 12, wherein a one of the weights W1, W2, W3 is greatest based on which of the values V1, V2, V3 is relatively greater.

14. The method of claim 8, wherein the one or more retired neural network models comprise models of the neural network that were previously used.

15. A system for detection of unsupervised data drift, comprising:
an image sensor configured to sense a data stream of images; and
a processor, the processor configured to:
receive the data stream of images;
provide the data stream of images to a neural network;
a neural network configured to generate class wise probabilities;
the processor further configured to:
store each image of the data stream of images in a database;
store the class wise probabilities generated by the neural network;
compare artifacts of images of the data stream at a first time with artifacts of images of the data stream at a second time;
compare artifacts produced by the class wise probabilities of the data stream retrieved from the stored class wise probabilities at a third time with artifacts produced by the class wise probabilities of the data stream retrieved from the stored class wise probabilities at a fourth time; and
generate an informative communication based on the compared artifacts of images of the data stream at the first time with images of the data stream at the second time and based on the compared images of the data stream retrieved from the stored class wise probabilities at the third time with images of the data stream retrieved from the stored class wise probabilities at the fourth time;
wherein the informative communication is generated when a weighted combination of a weight W1 of the compared artifacts of images of the data stream at the first time with artifacts of images of the data stream at the second time, and a weight W2 of the compared artifacts produced by the class wise probabilities of the data stream retrieved from the stored class wise probabilities at a third time with artifacts produced by the class wise probabilities of the data stream retrieved from the stored class wise probabilities at a fourth time, is greater than a weighted threshold.

16. The system of claim 15, wherein the processor is further configured to:
provide the data stream of images to one or more retired neural network models; and
compare outputs of the one or more retired network models with outputs of the class wise probabilities;
wherein the informative communication is generated further based on the compared outputs of the one or more retired network models with outputs of the class wise probabilities.

* * * * *